United States Patent [19]

Abreu et al.

[11] Patent Number: 5,059,990

[45] Date of Patent: Oct. 22, 1991

[54] IMAGE TRANSFER AND SHEET SEPERATION CHARGING

[75] Inventors: Christian O. Abreu, Rochester; Jon M. Beresniewicz, Webster; James A. Long, Penfield; Thomas W. Pike, Rochester, all of N.Y.

[73] Assignee: Xerox Corporation, Stamford, Conn.

[21] Appl. No.: 521,496

[22] Filed: May 10, 1990

[51] Int. Cl.[5] ...................... G01D 15/06; G03G 21/00

[52] U.S. Cl. .................................... 346/153; 346/159; 346/160; 346/157; 355/219; 355/221; 355/315

[58] Field of Search ..................... 346/153.1, 154, 155, 346/157, 159, 160, 108; 355/221, 219, 315, 273, 274

[56] References Cited

U.S. PATENT DOCUMENTS

| | | | |
|---|---|---|---|
| 4,055,380 | 10/1977 | Borostyan | 355/273 |
| 4,338,017 | 7/1982 | Nishikawa | 355/273 |
| 4,401,383 | 8/1983 | Suzuki et al. | 355/273 |
| 4,412,732 | 11/1983 | Ogata et al. | 355/274 |
| 4,482,240 | 11/1984 | Kuge | 355/3 TR |
| 4,641,955 | 2/1987 | Yuaas | 355/14 TR |
| 4,736,227 | 4/1988 | Till et al. | 355/273 |
| 4,737,816 | 4/1988 | Inoue et al. | 355/274 |
| 4,876,578 | 10/1989 | Hara et al. | 355/273 |
| 4,888,621 | 12/1989 | Ohno | 346/157 |

*Primary Examiner*—Benjamin R. Fuller
*Assistant Examiner*—Randy W. Gibson
*Attorney, Agent, or Firm*—H. Fleischer; J. E. Beck; R. Zibelli

[57] ABSTRACT

An apparatus which transfers successive different color toner images from a photoconductive belt to a sheet. The toner images are in superimposed registration with one another. Transfer efficiency of successive toner images is improved by neutralizing the charge on the toner image prior to the transfer of the next successive toner image to the sheet. This is accomplished by passing the sheet with the toner image transferred thereto between upper and lower neutralization corona generators. The upper neutralization corona generator applies a charge on the toner image having an opposite polarity to the normal polarity of the toner image. The lower neutralization corona generator applies a charge on the backside of the sheet having the same polarity as the normal polarity of the toner image.

4 Claims, 2 Drawing Sheets

IMAGE TRANSFER AND SHEET SEPERATION CHARGING

Figure 1:
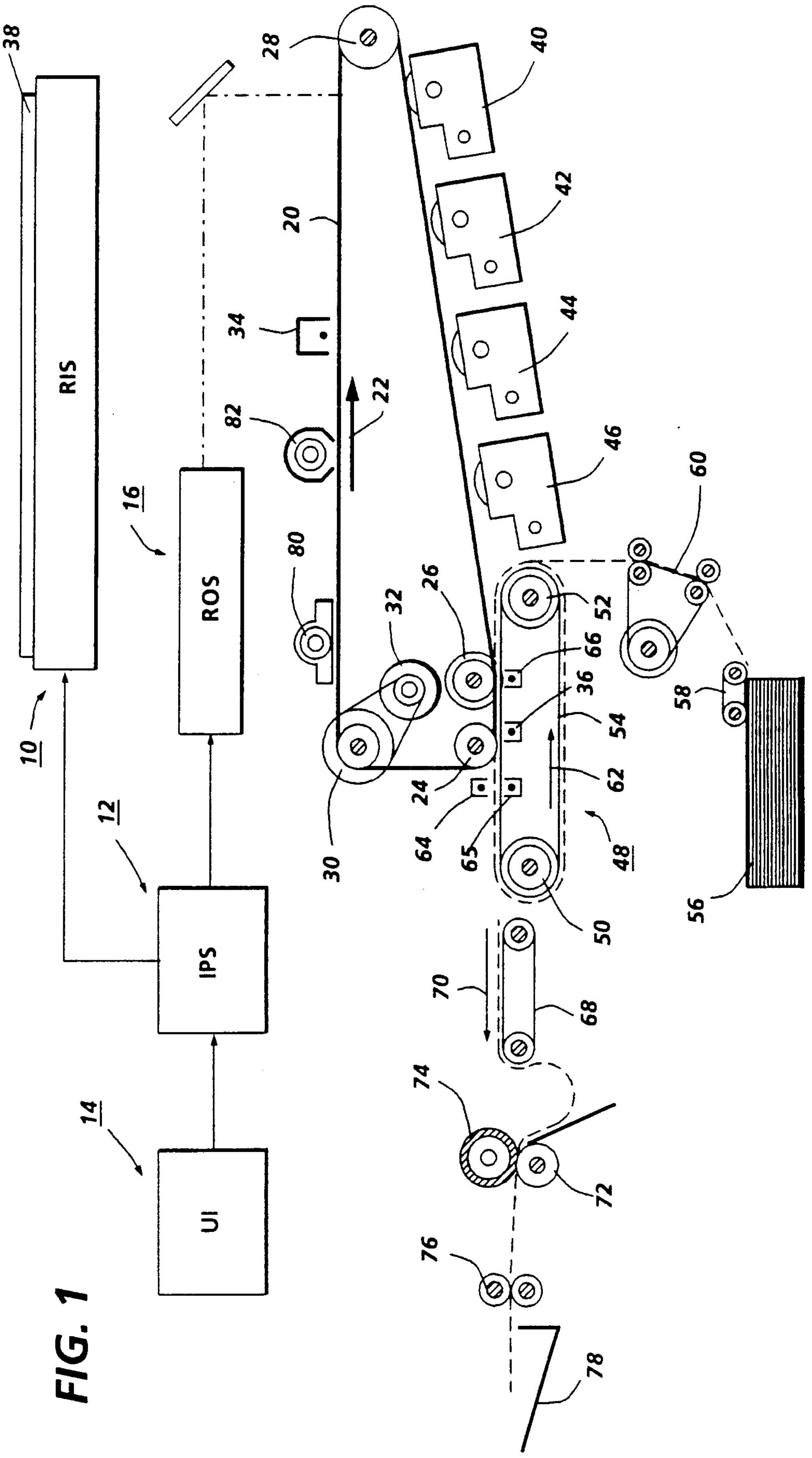

This invention relates generally to a color electrophotographic printing machine, and more particularly concerns an apparatus for improving transfer of successive, different color toner images in superimposed registration with one another on a common sheet.

In an electrophotographic printing machine, a photoconductive member is charged to a substantially uniform potential to sensitize the surface thereof. The charged portion of the photoconductive member is exposed. Exposure of the charged photoconductive member selectively dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing toner into contact therewith. This forms a developed toner image on the photoconductive member which is subsequently transferred to a copy sheet. The copy sheet is heated to permanently affix the toner image thereto in image configuration.

Multi-color electrophotographic printing is substantially identical to the foregoing process of black and white printing. However, rather than forming a single latent image on the photoconductive surface, successive latent images corresponding to different colors are recorded thereon. Each single color electrostatic latent image is developed with toner of a color complimentary thereto. This process is repeated a plurality of cycles for differently colored images and their respective complimentarily colored toner. Each single color toner image is transferred to the copy sheet in superimposed registration with the prior toner image. This creates a multilayered toner image on the copy sheet. Thereafter, the multi-layered toner image is permanently affixed to the copy sheet creating a color copy. The developer material may be a liquid material or a powder material.

In order to successfully transfer different color toner images to the copy sheet, the copy sheet moves in a recirculating path. A sheet gripper secured to a transport receives the copy sheet and transports it in a recirculating path enabling successive different color images to be transferred thereto. The sheet gripper grips one edge of the copy sheet and moves the sheet in a recirculating path so that accurate multipass color registration is achieved. In this way magenta, cyan, yellow and black toner images are transferred to the copy sheet. A corona generator may be used to charge the copy sheet to attract the toner images thereto. However, there is a significant reduction in transfer efficiency when attempting to transfer toner images to a location on the sheet having a toner image previously transferred thereto. Moreover, when more than one color toner is used to develop a line, the transferred line is blurred. Also, transfer may be mottled and non-uniform. Various approaches have been devised to improve transfer of toner images, the following disclosures appear to be relevant:

U.S. Pat. No. 4,641,955, patentee: Yuasa, issued: Feb. 10, 1987;

U.S. Pat. No. 4,482,240, patentee: Kuge et al., issued: Nov. 13, 1984.

The relevant portion of the foregoing patents may be briefly summarized as follows:

U.S. Pat. No. 4,641,955 discloses a pre-transfer corona generator which charges a toner image on a photosensitive drum. A transfer corona generator charges the rear surface of the transfer sheet to a polarity opposite to that of the toner after the pre-transfer charging. The charge applied to the rear face of the transfer sheet by a separating corona generator is of a polarity opposite to that of the charge applied in the transfer step.

U.S. Pat. No. 4,482,240 describes an ion generator that generates ions having a polarity opposite to the polarity of the toner on a transfer member. The streams of ions are controlled pixel by pixel so that toner particles are selectively deposited on the transfer member.

Pursuant to the features of the present invention, there is provided an apparatus for transferring a toner image from a member to a sheet. The apparatus includes means for moving the sheet in synchronism with the member. First means apply a charge to the sheet of a polarity opposite to that of the charge on the toner image for transferring the toner image from the member to the sheet. Second means, located after the first means in the direction of movement of the sheet, apply a charge to the sheet of a polarity which is the same as that of the charge on the toner image to assist in separating the sheet from the member and control air breakdown upon separation of the sheet from the member. Means, located after the second means in the direction of movement of the sheet, is provided for discharging the toner image transferred to the sheet.

In accordance with another aspect of the present invention, there is provided an electrophotographic printing machine of the type in which different color toner images developed on a moving photoconductive member are transferred, in superimposed registration with one another, to a sheet. The improvement includes means for moving the sheet, in a recirculating path, in synchronism with the moving photoconductive member. First means are provided for applying a charge to the sheet of a polarity opposite to that of the charge on the toner images for transferring the toner images from the photoconductive member to the sheet. Second means, located after the first means in the direction of movement of the sheet, apply a charge to the sheet of a polarity which is the same as that of the charge on the toner images to assist in separating the sheet from the photoconductive member and control air breakdown upon separation of the sheet from the photoconductive member. Means, located after the second means in the direction of movement of the sheet, discharges each toner image transferred to the sheet.

Figure 2:
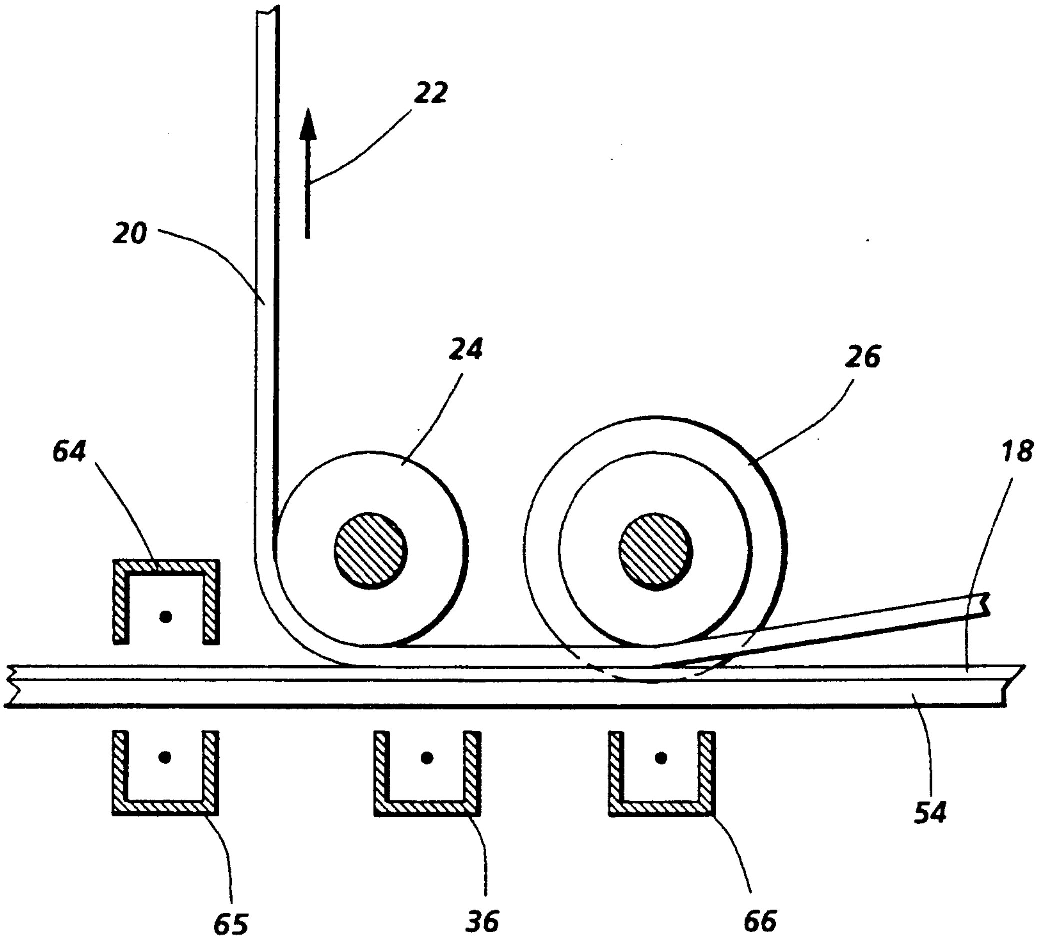

Other aspects of the present invention will become apparent as the following description proceeds and upon reference to the drawings, in which:

FIG. 1 is a schematic elevational view illustrating an electrophotographic printing machine incorporating the features of the present invention therein; and FIG. 2 is a schematic elevational view showing further details of the transfer apparatus used in the FIG. 1 printing machine.

While the present invention will hereinafter be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

For a general understanding of the features of the present invention, reference is made to the drawings. In the drawings, like references have been used throughout to designate identical elements. FIG. 1 is a schematic elevational view of an illustrative electropohotographic printing machine incorporating the features of the present invention therein. It will become evident from the following discussion that the present invention is equally well suited for use in a wide variety of printing machines, and is not necessarily limited in its application to the particular printing machine shown herein.

Turning initially to FIG. 1, during operation of the printing machine, a multi-color original document 38 is positioned on a raster input scanner (RIS), indicated generally by the reference numeral 10. The RIS contains document illumination lamps, optics, a mechanical scanning drive, and a charge coupled device (CCD array). The RIS captures the entire original document and converts it to a series of raster scan lines and measures a set of primary color densities, i.e. red, green and blue densities, at each point of the original document. This information is transmitted to an image processing system (IPS), indicated generally by the reference numeral 12. IPS 12 is the control electronics which prepare and manage the image data flow to the raster output scanner (ROS), indicated generally by the reference numeral 16. A user interface (UI), indicated generally by the reference numeral 14, is in communication with the IPS. The UI enables the operator to control the various operator adjustable functions. The output signal from the UI is transmitted to IPS 12. The signal corresponding to the desired image is transmitted from IPS 12 to ROS 16, which creates the output copy image. ROS 16 lays out the image in a series of horizontal scan lines with each line having a specified number of pixels per inch. The ROS includes a laser having a rotating polygon mirror block associated therewith. The ROS exposes the charged photoconductive surface of belt 20 to record a set of latent images. The latent images are developed with magenta, cyan, yellow, and black developer material, respectively. These developed images are transferred to a copy sheet in superimposed registration with one another to form a multi-colored image on the copy sheet. This multi-colored image is then fused to the copy sheet forming a color copy.

With continued reference to FIG. 1, photoconductive belt 20 is made from a polychromatic photoconductive material. Belt 20 moves in the direction of arrow 22 to advance successive portions of the photoconductive surface sequentially through the various processing stations disposed about the path of movement thereof. Belt 20 is entrained about transfer roller 24, detack backup roller 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through the charging station. At the charging station, a corona generating device, indicated generally by the reference numeral 34 charges photoconductive belt 20 to a relatively high, substantially uniform potential.

Next, the charged photoconductive surface is rotated to the exposure station. The exposure station includes the RIS 10 having a multi-colored original document 38 positioned thereat. The RIS captures the entire image from the original document 38 and converts it to a series of raster scan lines which are transmitted as electrical signals to IPS 12. The electrical signals from the RIS correspond to the red, green and blue densities at each point in the document. The IPS converts the set of red, green and blue density signals, i.e. the set of signals corresponding to the primary color densities of original document 38, to a set of colorimetric coordinates. The operator actuates the appropriate keys of the UI 14 to adjust the parameters of the copy. UI 14 may be a touch screen or any other suitable control panel providing an operator interface with the system. The output signals from the UI are transmitted to the IPS. The IPS then transmits signals corresponding to the desired image to ROS 16. ROS 16 includes a laser with rotating polygon mirror blocks. Preferably, a nine facet polygon is used. The ROS illuminates the charged portion of photoconductive belt 20 at a rate of about 400 pixels per inch. The ROS will expose the photoconductive belt to record four latent images. One latent image is adapted to be developed with cyan developer material. Another latent image is adapted to be developed with magenta developer material. The third latent image is developed with yellow developer material, and the fourth with black developer material. The latent images formed by the ROS on the photoconductive belt correspond to the signals from IPS 12.

After the electrostatic latent image has been recorded on photoconductive belt 20, belt 20 advances the electrostatic latent image to the development station. The development station includes four individual developer units generally indicated by the reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer particles are continually moving so as to provide the brush consistently with fresh developer material. Development is achieved by bringing the brush of developer material into contact with the photoconductive surface. Developer units 40, 42, and 44, respectively, apply toner particles of a specific color which corresponds to the compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 10, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from black information or text. Each of the developer units is moved into and out of the operative position. In the operative position, the magnetic brush is closely adjacent the photoconductive belt, while, in the non-operative position, the magnetic brush is spaced therefrom. During development of each electrostatic latent image only one developer unit is in the operative position, the remaining developer units are in the non-operative position. This insures that each electrostatic latent image is developed with toner particles of the appropriate color without co-mingling. In FIG. 1, developer unit 40 is shown in the operative position with developer units 42, 44 and 46 being in the non-operative position.

After development, the toner image is moved to the transfer station where the toner image is transferred to a sheet of support material, such as plain paper amongst others. At the transfer station, the sheet transport apparatus, indicated generally by the reference numeral 48, moves the sheet into contact with photoconductive belt 20. Sheet transport 48 has a pair of spaced belts 54 entrained about rolls 50 and 52. A gripper extends between belts 54 and moves in unison therewith. The sheet is advanced from a stack of sheets 56 disposed on a tray. A friction retard feeder 58 advances the uppermost sheet from stack 56 onto a pretransfer transport 60. Transport 60 advances the sheet to sheet transport 48. The sheet is advanced by transport 60 in synchronism with the movement of the gripper. In this way, the leading edge of the sheet arrives at a preselected position to be received by the open gripper. The gripper then closes securing the sheet thereto for movement therewith in a recirculating path. The leading edge of the sheet is secured releasably by the gripper. As the belts move in the direction of arrow 62, the sheet moves into contact with the photoconductive belt, in synchronism with the toner image developed thereon. At the transfer zone, a transfer corona generating device 66 sprays ions onto the backside of the sheet so as to charge the sheet to a polarity opposite to that of the charge on the toner image. In this way, the sheet is charged to the proper magnitude and polarity for attracting the toner image from photoconductive belt 20 thereto. The sheet is then separated from photoconductive belt 20. After the toner image is transferred to the sheet and the sheet separated from photoconductive belt 20, the sheet passes between upper neutralizing corona generator 64 and lower neutralizing corona generator 65. The upper neutralization corona generator 64 applies a charge to the toner image of opposite polarity to the polarity on the toner image. The lower neutralization corona generator 65 applies a charge to the sheet of the same polarity as the charge on the toner image. The charge delivered to the toner image by upper neutralization corona generator 64 serves to discharge the toner image that was just transferred to the sheet, and, in so doing, improves the efficiency of the transfer of the next toner image in those areas where the transfer must occur on top of the now discharged toner image. The function of lower neutralization corona generator 65 is to act as a ground plane behind the sheet and supply an amount of charge equal to that supplied by upper neutralization corona generator 64 to the toner image but of opposite polarity. The sheet remains secured to the gripper so as to move in a recirculating path for four cycles. In this way, four different color toner images are transferred to the sheet in superimposed registration with one another. Each of the electrostatic latent images recorded on the photoconductive surface is developed with the appropriately colored toner which are transferred, in superimposed registration with one another, to the sheet to form the multi-color copy of the colored original document.

Following each transfer operation, detack corona generator 36 is energized to apply a charge to the sheet of a polarity which is the same as that of the charge on the toner image to separate the sheet from the photoconductive belt 20. After the last separation, the grippers open to release the sheet. Conveyor 68 transports the sheet, in the direction of arrow 70, to the fusing station where the transferred image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by forwarding roll pairs 76 to catch tray 78 for subsequent removal therefrom by the machine operator.

The last processing station in the direction of movement of belt 20, as indicated by arrow 22, is the cleaning station. A rotatably mounted fibrous brush 80 is positioned in the cleaning station and maintained in contact with photoconductive belt 20 to remove residual toner particles remaining after the transfer/detack operation. Thereafter, lamp 82 illuminates photoconductive belt 20 to remove any residual charge remaining thereon prior to the start of the next successive cycle.

Referring now to FIG. 2, transferring of successive toner images to copy sheet 18 will be described in greater detail. At the transfer zone, transfer corona generator 66 sprays ions onto the backside of sheet 18 to charge the sheet to a polarity opposite to that of the charge on the toner image. In this way, sheet 18 is charged to the proper magnitude and polarity to attract the toner image from photoconductive belt 20 thereto. After the toner image is transferred to the sheet, the sheet is separated from photoconductive belt 20 under detack corona generator 36. Then the sheet passes between upper neutralizing corona generator 64 and lower neutralizing corona generator 65. Upper neutralization corona generator 64 applies a charge to the toner image having an opposite polarity to the polarity of the charge on the toner image. The lower neutralization corona generator 65 applies a charge to the back side of sheet 18 having the same polarity as the charge on the toner image. The charge applied to the toner image by upper neutralization corona generator 64 discharges the toner image that was previously transferred to the sheet 18. In this way, the efficiency of the transfer of the next toner image on top of the now discharged toner image is improved. Also, in micro-areas, where unusually large amounts of toner are transferred to the sheet, the charge from the upper neutralization corona generator serves to reverse the polarity of small amounts of the toner on sheet 18. This causes back transfer of toner from these high density spots when the next transfer step occurs and results in a smoother more uniform density. The function of lower neutralization corona generator 65 is to act as a ground plane behind sheet 18 and supply an amount of charge equal to that supplied by upper neutralization corona generator 64 to the toner image but of opposite polarity. Without the lower neutralization corona generator, less than the optimum current from the upper neutralization corona generator will flow to the toner image on the sheet. However, some current will flow, some discharging will occur, and some benefit will result. One skilled in the art will appreciate that a grounded conducting plate, such as a vacuum plenum, or a brush may be used in lieu of the lower neutralization corona generator. However, if such a system is used, the sheet must be kept in contact with the ground plane. By using the lower neutralization corona generator instead of a ground plate, the requirement of contact and associate complexities introduced by this requirement are eliminated. A typical corona generator used for the transfer corona generator, upper and lower neutralization corona generators and the detack corona generator includes a coronode wire or pin array mounted in a generally U-shaped shield. The sheet moves in a recirculating path for four cycles so that, four different color toner images are transferred to the sheet in superimposed registration with one another. After each transfer operation, detack corona generator 36 is energized and applies a charge to the sheet of a polarity which is the same as that of the charge on the toner image to separate the sheet from the photoconductive belt 20. After the last separation, neutralization corona generators 64 and 65 are de-energized. Preferably, upper neutralization corona generator 64 and lower neutralization corona generator 65 are AC devices operating at 440 hz with peak to peak voltages ranging from about 8 kilovolts to about 11 kilovolts. An offset to the AC high voltage wave is applied to one or both corona generators to achieve the proper dynamic current to the toner image to achieve the charge reduction without reversing the polarity of large amounts of toner. As an alternative, a constant plate current type of device could be used in lieu of the upper neutralization corona generator. By passing the sheet between the neutralization corona generators after transferring each toner image thereto, mottle is reduced and multi-layer transfer efficiency improved. Furthermore haze or blur is significantly reduced.

In recapitulation, the transfer apparatus of the present invention applies a charge onto the backside of a recirculating sheet to transfer the toner image thereto. After the transfer of each toner image to the copy sheet and each separation from the photoconductive belt, the charge on the transferred toner image is reduced to improve the efficiency of the transfer of the next toner image.

It is, therefore, evident that there has been provided in accordance with the present invention, a transfer apparatus that fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

We claim:

1. An apparatus for transferring a toner image having a charge thereon from a member to a sheet, including:

means for moving the sheet in a direction such that the sheet moves in synchronism with the member in a recirculating path enabling successive toner images to be transferred to the sheet in superimposed registration with one another;

a first corona generator for applying a charge to the sheet of a polarity opposite to that of the charge on the toner image for transferring the toner image from the member to the sheet;

a second corona generator, located after said first corona generator in the direction of movement of the sheet, for applying a charge to the sheet of a polarity which is the same as that of the charge on the toner image to assist in separating the sheet from the member and control air ionization during separation of the sheet from the member;

a third corona generator, located after said second corona generator in the direction of movement of the sheet, applies a charge on the toner image of a polarity opposite to that of the charge on the toner image for discharging the toner image transferred to the sheet; and means for electrically grounding the sheet as said third corona generator applies the charge on the toner image.

2. An apparatus according to claim 1, wherein said grounding means includes a second corona generator adapted to apply a charge on the sheet of a polarity opposite to that being applied on the toner image by said first corona generator.

3. A printing machine according to claim 1, wherein said grounding means includes a second corona generator adapted to apply a charge on the sheet of a polarity opposite to that being applied on the toner image by said first corona generator.

4. An electrophotographic printing machine in which different color toner images having a charge thereon are developed on a moving photoconductive member and transferred, in superimposed registration with one another, to a sheet, wherein the improvement includes:

means for moving the sheet, in a direction such that the sheet moves in a recirculating path, in synchronism with the moving photoconductive member;

a first corona generator for applying a charge to the sheet of a polarity opposite to that of the charge on the toner images for transferring the toner images from the photoconductive member to the sheet;

a second corona generator, located after said first corona generator in the direction of movement of the sheet, for applying a charge to the sheet of a polarity which is the same as that of the charge on the toner images to assist in separating the sheet from the photoconductive member and control air ionization during separation of the sheet from the photoconductive member;

a third corona generator, located after said second corona generator in the direction of movement of the sheet, applies a charge on the toner image of a polarity opposite to that of the charge on the toner image for discharging each toner image transferred to the sheet;

means for electrically grounding the sheet as said third corona generator applies the charge on the toner image.

* * * * *

UNITED STATES PATENT AND TRADEMARK OFFICE

CERTIFICATE OF CORRECTION

PATENT NO. : 5,059,990

DATED : October 22, 1991

INVENTOR(S) : ABREU et al.

It is certified that error appears in the above-indentified patent and that said Letters Patent is hereby corrected as shown below:

Column 8, line 27, change "first" to --third--;

line 28, change "3." to --4.--;

line 28, change "1" to --3--;

line 32, change "first" to --third--; and line 33, change "4." to --3.--.

Signed and Sealed this

Eighth Day of October, 1996

Attest:

BRUCE LEHMAN

*Attesting Officer*

*Commissioner of Patents and Trademarks*